June 4, 1929.　　　　J. SLEPIAN　　　　1,715,681
CIRCUIT INTERRUPTING DEVICE
Filed July 19, 1920
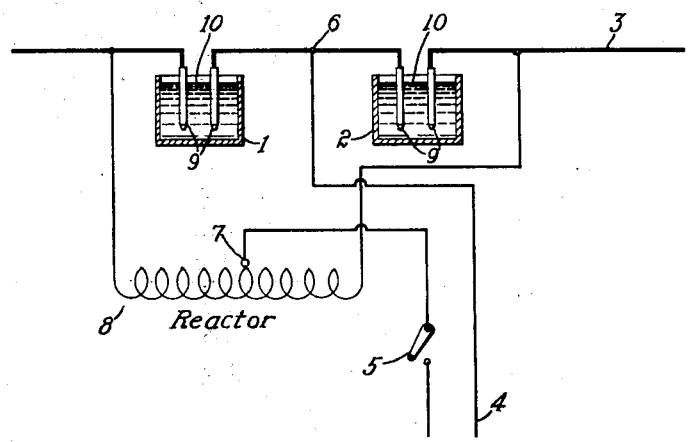
WITNESSES:　　　　　　　　　　　　　　　　　　　INVENTOR
　　　　　　　　　　　　　　　　　　　　　　　Joseph Slepian
　　　　　　　　　　　　　　　　　　　　　　　　BY
　　　　　　　　　　　　　　　　　　　　　　　　　　ATTORNEY Patented June 4, 1929.

1,715,681

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTING DEVICE.

Application filed July 19, 1920. Serial No. 397,369.

My invention relates to circuit interrupters and particularly to means for interrupting alternating-current circuits.

The object of my invention is to provide a device of the above indicated character that shall comprise a conducting circuit which may be continuously mechanically connected and that shall have means for interrupting the flow of current beyond the same without recourse to the usual expedients of shunting or mechanically separating the parts of the conductor or extinguishing an arc in an air gap in the circuit.

In practicing my invention, I provide an alternating-current circuit and an electrolytic device that is so constructed and connected in the circuit as to normally permit the free flow of current. When a direct current is superimposed on the electrolytic device, the alternating-current wave will be so distorted or increased during its half cycle in one direction as to form a non-conducting film in the circuit.

The single figure of the accompanying drawings is a diagrammatic view of the circuit interrupting device embodying my invention.

In general, my device comprises electrolytic devices 1 and 2 connected in series relation to each other and to a main alternating-current circuit 3 which it is desired to interrupt. A direct-current circuit 4, having a switch 5 therein, is connected at one side to a point 6 between the electrolytic devices 1 and 2, and at its other side to an intermediate point 7 in a reactor 8 that is connected in shunt relation to the devices 1 and 2.

The electrolytic devices 1 and 2 comprise electrodes 9 constructed of such material that, in cooperation with a suitable electrolyte 10, they will not polarize or cause the formation of films thereon during their connection in an alternating-current circuit but that, when subjected to a direct current that is superimposed on the alternating current, will cause the films to form and thus interrupt the flow of alternating current. Electrodes of antimony in almost any electrolyte, zinc in a carbonate solution and other combinations of electrodes and electrolytes, will function in the above mentioned manner.

The direct-current circuit 4 being connected to the point 6, in the main circuit 3, and to the point 7 in the reactor 8, will be thus subjected to zero potential in the alternating-current circuit to prevent the alternating-current voltage being impressed or superimposed on the direct-current circuit 4. By closing the switch 5, direct current from the circuit 4 will be superimposed on the alternating current of the circuit 3 which will so distort or increase the alternating current during its first half cycle in one direction as to cause non-conducting films to form on the electrodes 9.

Assuming that direct current, through the terminal 6, is imposed upon an alternating current flowing from left to right through the main circuit 3, a film will be formed upon the positive electrode 9 which is to the right of the terminal 6. If the flow of alternating current is in the opposite direction, the path of the direct current through the terminal 6 will be to the left and a film will be formed on that electrode which is nearest to the terminal 6 at the left thereof.

In the ordinary forms of circuit interrupters, interruption of a circuit is usually attended by arcs and explosions. In the device of my invention, the energy usually dissipated during the interruption of a circuit is spent in forming the films, thereby ensuring a quietly-operating and effective form of interrupter.

While I have shown and described a particular form of my invention, changes may be effected therein without departing from the spirit and scope thereof, as set forth in the appended claims.

I claim as my invention:

1. A circuit interrupter comprising electrolytic means normally permitting the uninterrupted passage of alternating current therethrough but that is chemically altered to interrupt the flow of said current when direct current is superimposed thereon and means for superimposing the said direct current.

2. A circuit interrupter comprising conductor means normally permitting the uninterrupted passage of alternating current therethrough but which is rendered nonconductive and interrupts said current when a direct current is superimposed thereon and means for superimposing the said direct current.

3. A circuit interrupter comprising electrolytic means normally permitting the uninterrupted passage of alternating current therethrough but that interrupts said current when a direct current is superimposed thereon and means for so superimposing the direct current.

4. An alternating-current circuit interrupter having means for interrupting the circuit connected thereto including means for superimposing a direct current on said circuit interrupter and means for preventing the imposition of the alternating-circuit voltage on said direct-current circuit.

5. A circuit interrupter comprising a pair of electrolytic devices connected in series relation in an alternating-current circuit, a reactive circuit connected in shunt to the electrolytic devices and a direct-current circuit connected to an intermediate point in each of said alternating and said reactive circuits.

6. The combination with an alternating-current circuit, of a conductor element constituting a part thereof and adapted to be rendered non-conductive by the application of direct current to the aforesaid circuit and switching means for applying the direct current when it is desired to interrupt the alternating-current circuit.

7. A circuit interrupter comprising a conductor element substantially non-resistant to alternating current and means for rendering it resistive by a superimposed direct current.

8. A circuit interrupter comprising a conductor element normally substantially non-resistant to alternating current and rendered resistant by direct current and means for imposing a direct current upon the element for rendering the element resistant to alternating current.

9. A circuit interrupter comprising a pair of elements which conduct alternating current freely but which offer substantially higher resistance to direct current, connected in series relation in an alternating-current circuit, a reactive circuit connected in shunt to the said pair of elements and a direct-current circuit connected to an intermediate point in each of said alternating and said reactive circuits.

10. A circuit interrupter comprising a pair of elements which conduct alternating current freely but which offer substantially higher resistance to direct current connected in series relation in an alternating-current circuit, an impedance circuit connected in shunt to the said pair of elements, and a direct-current circuit connected to an intermediate point in each of said alternating and said impedance circuits.

11. A circuit interrupter comprising similar elements which conduct alternating current freely but which offer substantially higher resistance to direct current connected in series relation in an alternating-current circuit, a reactive circuit connected in shunt to the said pair of elements, and a direct-current circuit connected to an intermediate point in each of said alternating and said reactive circuits.

12. A circuit interrupter comprising similar elements which conduct alternating current freely but which offer substantially higher resistance to direct current connected in series relation in an alternating-current circuit, an impedance circuit connected in shunt to the said pair of elements and a direct-current circuit connected to an intermediate point in each of said alternating and said impedance circuits.

13. A circuit interrupter comprising a pair of elements which conduct alternating current freely but which offer substantially higher resistance to direct current connected in series relation in an alternating-current circuit, an impedance circuit connected in shunt to the said pair of elements and a direct-current circuit connected between the common terminal of said elements and the mid-point of said impedance.

In testimony whereof, I have hereunto subscribed my name this 13th day of July, 1920.

JOSEPH SLEPIAN.